(12) United States Patent
Shin (10) Patent No.: US 10,410,314 B2
(45) Date of Patent: Sep. 10, 2019

(54) SYSTEMS AND METHODS FOR CROSSFADING IMAGE DATA

(71) Applicant: Apple Inc., Cupertino, CA (US)

(72) Inventor: Jaewon Shin, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 244 days.

(21) Appl. No.: 15/499,561

(22) Filed: Apr. 27, 2017

(65) Prior Publication Data

US 2018/0315156 A1 Nov. 1, 2018

(51) Int. Cl.
*G06T 1/20* (2006.01)
*G06T 3/40* (2006.01)
*G06T 5/50* (2006.01)
*G06T 3/00* (2006.01)

(52) U.S. Cl.
CPC ............. *G06T 1/20* (2013.01); *G06T 3/00* (2013.01); *G06T 3/40* (2013.01); *G06T 5/50* (2013.01); *G06T 2207/20221* (2013.01); *G06T 2210/22* (2013.01)

(58) Field of Classification Search
CPC .... G06T 1/20; G06T 3/00; G06T 5/50; G06T 3/40; G06T 2207/20221; G06T 2210/22
USPC ........................................................ 382/284
See application file for complete search history.

(56) References Cited

U.S. PATENT DOCUMENTS

| | | | |
|---|---|---|---|
| 8,767,085 B2 | 7/2014 | Park et al. | |
| 9,019,402 B2 | 4/2015 | Vrănceanu et al. | |
| 9,325,899 B1* | 4/2016 | Chou | G06T 7/593 |
| 2007/0071361 A1* | 3/2007 | Sanno | G09G 5/34 |
| | | | 382/298 |
| 2010/0238327 A1* | 9/2010 | Griffith | H04N 5/2251 |
| | | | 348/240.99 |
| 2011/0064327 A1* | 3/2011 | Dagher | G06T 5/004 |
| | | | 382/263 |
| 2012/0075489 A1 | 3/2012 | Nishihara | |
| 2012/0229593 A1* | 9/2012 | Liu | H04N 21/234363 |
| | | | 348/14.08 |

(Continued)

OTHER PUBLICATIONS

Lancelle, M., et al., "Smooth Transitions for Large Scale Changes in Multi-Resolution Images," Vision, Modeling, and Visualization, Oct. 2011, pp. 81-87, The Eurographics Association.

(Continued)

*Primary Examiner* — Jerome Grant, II
(74) *Attorney, Agent, or Firm* — Fenwick & West LLP (57) ABSTRACT

A cross fader circuit that receives first raw image data and second raw image data and outputs blended raw image data. The cross fader circuit includes a first scaling circuit, a second scaling circuit, and an alpha blender. The first scaling circuit downscales first raw image data captured by a first sensor with a first field of view to match a size of a blending window. The second scaling circuit upscales second raw image data to match the size of a canvas window that encloses the blending window. The second raw image data may be a cropped version of raw image data captured by a second sensor of a second field of view wider than the first field of view. An alpha blender circuit generates a blended raw image data matching the size of the canvas window from the downscaled first raw image data and upscaled second raw image data.

20 Claims, 8 Drawing Sheets

(56) References Cited

U.S. PATENT DOCUMENTS

| | | | |
|---|---|---|---|
| 2013/0182151 A1* | 7/2013 | Takagi | H04N 5/2621 |
| | | | 348/240.99 |
| 2014/0256429 A1* | 9/2014 | Kobayashi | A63F 13/02 |
| | | | 463/31 |
| 2015/0253710 A1* | 9/2015 | Tomita | G03G 15/50 |
| | | | 399/86 |
| 2015/0281638 A1* | 10/2015 | Miyauchi | H04N 7/0122 |
| | | | 348/445 |
| 2016/0071240 A1 | 3/2016 | Liu | |
| 2016/0112650 A1 | 4/2016 | Laroia et al. | |
| 2017/0251911 A1* | 9/2017 | Ito | G02B 23/2438 |
| 2018/0150684 A1* | 5/2018 | Wang | G06T 7/11 |
| 2018/0300714 A1* | 10/2018 | Lieberman | G06F 3/04845 |

OTHER PUBLICATIONS

PCT International Search Report and Written Opinion, PCT Application No. PCT/US2018/021390, dated May 9, 2018, 16 pages.

\* cited by examiner

SYSTEMS AND METHODS FOR CROSSFADING IMAGE DATA

BACKGROUND

Image data captured by an image sensor or received from other data sources is often processed in an image processing pipeline before further processing or consumption. For example, raw image data may be corrected, filtered, or otherwise modified before being provided to subsequent components such as a video encoder. To perform corrections or enhancements for captured image data, various components, unit stages or modules may be employed.

Such an image processing pipeline may be structured so that corrections or enhancements to the captured image data can be performed in an expedient way without consuming other system resources. Although many image processing algorithms may be performed by executing software programs on a central processing unit (CPU), execution of such programs on the CPU would consume significant bandwidth of the CPU and other peripheral resources as well as increase power consumption. Hence, image processing pipelines are often implemented as a hardware component separate from the CPU and dedicated to perform one or more image processing algorithms.

Image data may be captured by two image sensors, and processed by separate dedicated image processing pipelines. For example, a device may have two cameras where each camera has a different focal length and viewing angle. When a user viewing the device switches camera views between the two cameras, it is desirable to display the transition between the two camera views with a smooth transition. The smooth transition may be a zoom-in feature from a wide angle camera to a telephoto camera or a zoom-out feature from a telephoto camera to a wide angle camera. However, supporting such a feature of the smooth transition between the two cameras may consume computing resources of a processor that may also perform other processing operations and slow down overall processing operations as well as consume power to perform the transition operation.

SUMMARY

Embodiments of the present disclosure relate to a cross fader circuit that receives a first raw image data and second raw image data and outputs blended raw image data. The cross fader circuit includes a first scaling circuit, a second scaling circuit, and an alpha blender. The first scaling circuit downscales or upscales first raw image data to match a size of a blending window. The first raw image data is captured by a first sensor of a first field of view. The second scaling circuit upscales or downscales second raw image data to match the size of a canvas window that encloses the blending window. The second raw image data may be a cropped version of raw image data captured by a second sensor of a second field of view wider than the first field of view. An alpha blender circuit may receive a downscaled first raw image data and an upscaled second raw image data and generates a blended raw image data matching the size of the canvas window.

BRIEF DESCRIPTION OF THE DRAWINGS

The figures depict, and the detail description describes, various non-limiting embodiments for purposes of illustration only.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, the described embodiments may be practiced without these specific details. In other instances, well-known methods, procedures, components, circuits, and networks have not been described in detail so as not to unnecessarily obscure aspects of the embodiments.

Embodiments relate to a cross fader circuit of an electronic device that combines the camera input of two cameras to provide blended images transitioning from one camera view to another camera view. The electronic device include two or more cameras with overlapping field of view. The cross fader circuit performs scaling and blending on raw image camera inputs of Bayer patterns captured by the two or more cameras to generate blended raw images displayed during transition of a camera view to another camera view. By performing the blending operations by a dedicated cross fader circuit, the resources of a processor can be reserved and used in other computing.

An operating parameter described herein refers to a value that defines the operation of a component in a raw processing stage circuit. The operating parameter can be associated with different components of the raw processing stage such as a cropper, a scaler, or an alpha blender. The operating parameter may be a Boolean value that simply enables or disables components or methods associated with the different components of the sensor interface circuit.

Exemplary Electronic Device

Embodiments of electronic devices, user interfaces for such devices, and associated processes for using such devices are described. In some embodiments, the device is a portable communications device, such as a mobile telephone, that also contains other functions, such as personal digital assistant (PDA) and/or music player functions. Exemplary embodiments of portable multifunction devices include, without limitation, the iPhone®, iPod Touch®, Apple Watch®, and iPad® devices from Apple Inc. of Cupertino, Calif. Other portable electronic devices, such as wearables, laptops or tablet computers, are optionally used. In some embodiments, the device is not a portable communications device, but is a desktop computer or other computing device that is not designed for portable use. In some embodiments, the disclosed electronic device may include a touch sensitive surface (e.g., a touch screen display and/or a touch pad). An example electronic device described below in conjunction with FIG. 1 (e.g., device 100) may include a touch-sensitive surface for receiving user input. The electronic device may also include one or more other physical user-interface devices, such as a physical keyboard, a mouse and/or a joystick.

Figure 1:
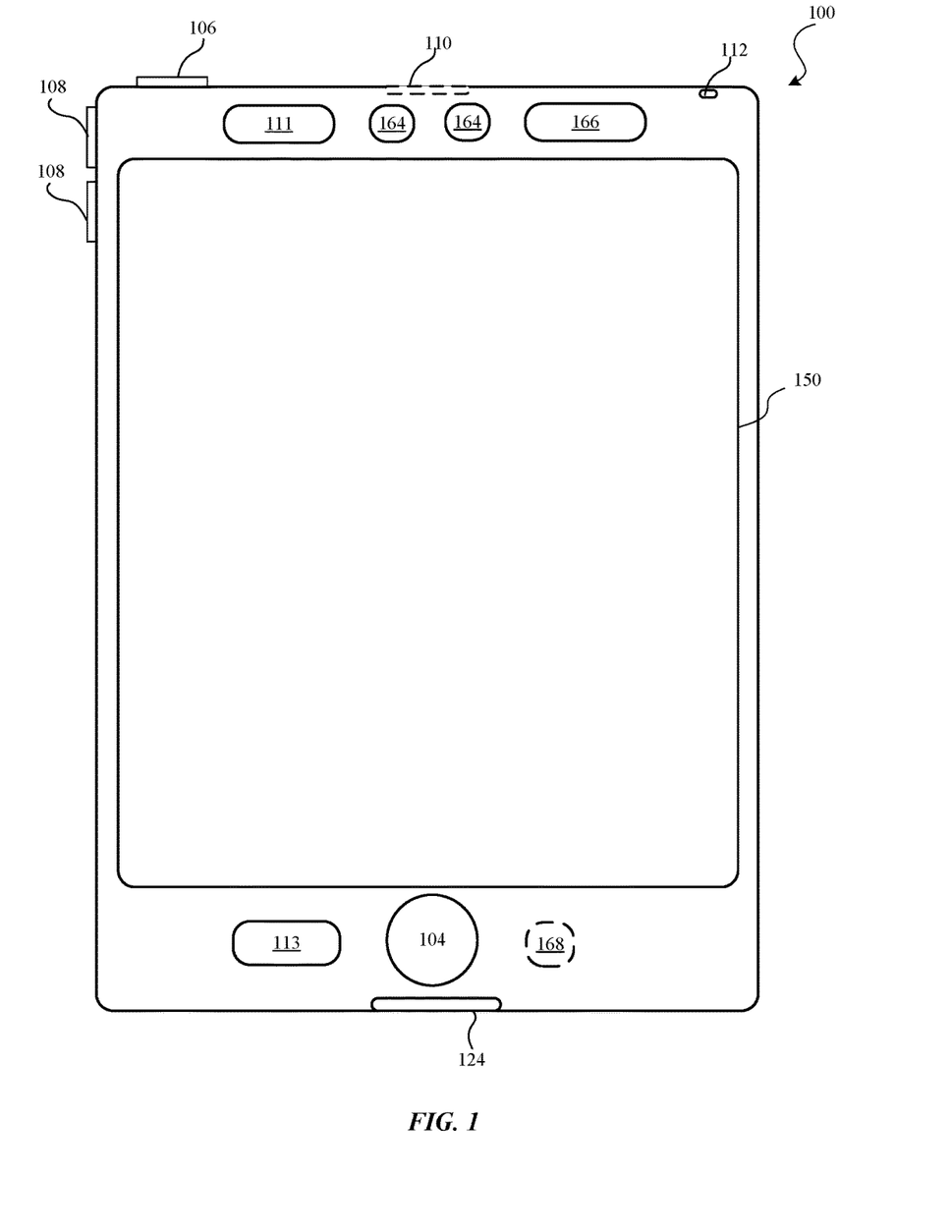
FIG. 1 is a high-level diagram of an electronic device, according to one embodiment

Figure (FIG. 1 is a high-level diagram of an electronic device 100, according to one embodiment. Device 100 may include one or more physical buttons, such as a "home" or menu button 104. Menu button 104 is, for example, used to navigate to any application in a set of applications that are executed on device 100. In some embodiments, menu button 104 includes a fingerprint sensor that identifies a fingerprint on menu button 104. The fingerprint sensor may be used to determine whether a finger on menu button 104 has a fingerprint that matches a fingerprint stored for unlocking device 100. Alternatively, in some embodiments, menu button 104 is implemented as a soft key in a graphical user interface (GUI) displayed on a touch screen.

In some embodiments, device 100 includes touch screen 150, menu button 104, push button 106 for powering the device on/off and locking the device, volume adjustment buttons 108, Subscriber Identity Module (SIM) card slot 110, head set jack 112, and docking/charging external port 124. Push button 106 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. The device 100 includes various components including, but not limited to, a memory (which may include one or more computer readable storage mediums), a memory controller, one or more central processing units (CPUs), a peripherals interface, an RF circuitry, an audio circuitry, speaker 111, microphone 113, input/output (I/O) subsystem, and other input or control devices. Device 100 may include one or more image sensors (i.e., cameras) 164, one or more proximity sensors 166, and one or more accelerometers 168. The device 100 may include components not shown in FIG. 1.

Device 100 is only one example of an electronic device, and device 100 may have more or fewer components than listed above, some of which may be combined into a components or have a different configuration or arrangement. The various components of device 100 listed above are embodied in hardware, software, firmware or a combination thereof, including one or more signal processing and/or application specific integrated circuits (ASICs).

Figure 2:
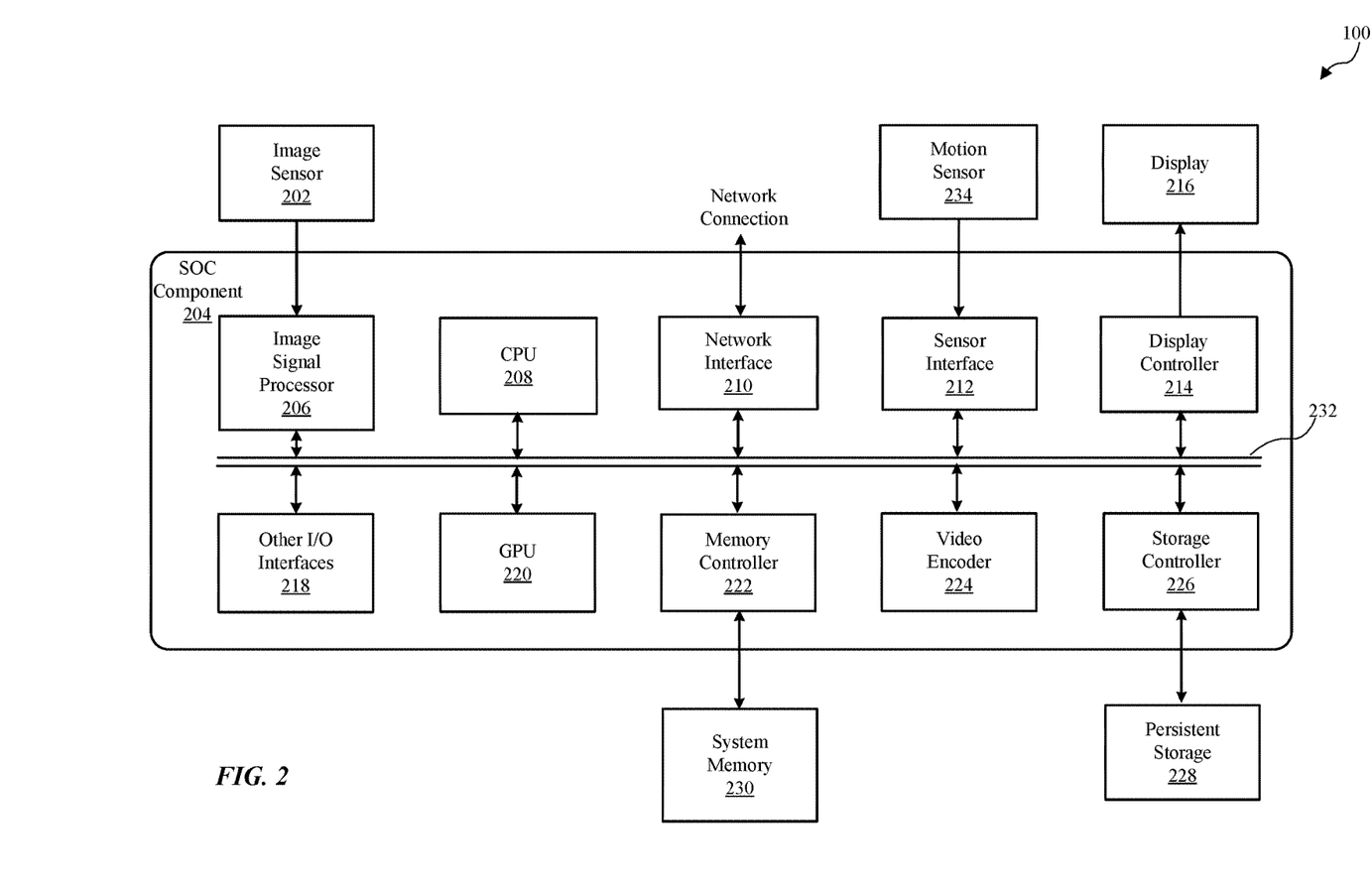
FIG. 2 is a block diagram illustrating components in the electronic device, according to one embodiment.

FIG. 2 is a block diagram illustrating components in device 100, according to one embodiment. Device 100 may perform various operations including image processing. For this and other purposes, the device 100 may include, among other components, image sensor 202, system-on-a chip (SOC) component 204, system memory 230, persistent storage (e.g., flash memory) 228, motion sensor 234, and display 216. The components as illustrated in FIG. 2 are merely illustrative. For example, device 100 may include other components (such as speaker or microphone) that are not illustrated in FIG. 2. Further, some components (such as motion sensor 234) may be omitted from device 100.

Image sensor 202 is a component for capturing image data and may be embodied, for example, as a complementary metal-oxide-semiconductor (CMOS) active-pixel sensor) a camera, video camera, or other devices. Image sensor 202 generates raw image data that is sent to SOC component 204 for further processing. In some embodiments, the image data processed by SOC component 204 is displayed on display 216, stored in system memory 230, persistent storage 228 or sent to a remote computing device via network connection. The raw image data generated by image sensor 202 may be in a Bayer color filter array (CFA) pattern (hereinafter also referred to as "Bayer pattern").

Motion sensor 234 is a component or a set of components for sensing motion of device 100. Motion sensor 234 may generate sensor signals indicative of orientation and/or acceleration of device 100. The sensor signals are sent to SOC component 204 for various operations such as turning on device 100 or rotating images displayed on display 216.

Display 216 is a component for displaying images as generated by SOC component 204. Display 216 may include, for example, liquid crystal display (LCD) device or an organic light emitting diode (OLED) device. Based on data received from SOC component 204, display 216 may display various images, such as menus, selected operating parameters, images captured by image sensor 202 and processed by SOC component 204, and/or other information received from a user interface of device 100 (not shown).

System memory 230 is a component for storing instructions for execution by SOC component 204 and for storing data processed by SOC component 204. System memory 230 may be embodied as any type of memory including, for example, dynamic random access memory (DRAM), synchronous DRAM (SDRAM), double data rate (DDR, DDR2, DDR3, etc.) RAMBUS DRAM (RDRAM), static RAM (SRAM) or a combination thereof. In some embodiments, system memory 230 may store pixel data or other image data or statistics in various formats.

Persistent storage 228 is a component for storing data in a non-volatile manner. Persistent storage 228 retains data even when power is not available. Persistent storage 228 may be embodied as read-only memory (ROM), NAND or NOR flash memory or other non-volatile random access memory devices.

SOC component 204 is embodied as one or more integrated circuit (IC) chip and performs various data processing processes. SOC component 204 may include, among other subcomponents, image signal processor (ISP) 206, a central processor unit (CPU) 208, a network interface 210, sensor interface 212, display controller 214, graphics processor (GPU) 220, memory controller 222, video encoder 224, storage controller 226, and various other input/output (I/O) interfaces 218, and bus 232 connecting these subcomponents. SOC component 204 may include more or fewer subcomponents than those shown in FIG. 2.

ISP 206 is hardware that performs various stages of an image processing pipeline. In some embodiments, ISP 206 may receive raw image data from image sensor 202, and process the raw image data into a form that is usable by other subcomponents of SOC component 204 or components of device 100. ISP 206 may perform various image-manipulation operations such as image translation operations, horizontal and vertical scaling, color space conversion and/or image stabilization transformations, as described below in detail with reference to FIG. 3.

CPU 208 may be embodied using any suitable instruction set architecture, and may be configured to execute instructions defined in that instruction set architecture. CPU 208 may be general-purpose or embedded processors using any of a variety of instruction set architectures (ISAs), such as the x86, PowerPC, SPARC, RISC, ARM or MIPS ISAs, or any other suitable ISA. Although a single CPU is illustrated in FIG. 2, SOC component 204 may include multiple CPUs. In multiprocessor systems, each of the CPUs may commonly, but not necessarily, implement the same ISA.

Graphics processing unit (GPU) 220 is graphics processing circuitry for performing graphical data. For example, GPU 220 may render objects to be displayed into a frame buffer (e.g., one that includes pixel data for an entire frame). GPU 220 may include one or more graphics processors that may execute graphics software to perform a part or all of the graphics operation, or hardware acceleration of certain graphics operations.

I/O interfaces 218 are hardware, software, firmware or combinations thereof for interfacing with various input/output components in device 100. I/O components may include devices such as keypads, buttons, audio devices, and sensors such as a global positioning system. I/O interfaces 218 process data for sending data to such I/O components or process data received from such I/O components.

Network interface 210 is a subcomponent that enables data to be exchanged between devices 100 and other devices via one or more networks (e.g., carrier or agent devices). For example, video or other image data may be received from other devices via network interface 210 and be stored in system memory 230 for subsequent processing (e.g., via a back-end interface to image signal processor 206, such as discussed below in FIG. 3) and display. The networks may include, but are not limited to, Local Area Networks (LANs) (e.g., an Ethernet or corporate network) and Wide Area Networks (WANs). The image data received via network interface 210 may undergo image processing processes by ISP 206.

Sensor interface 212 is circuitry for interfacing with motion sensor 234. Sensor interface 212 receives sensor information from motion sensor 234 and processes the sensor information to determine the orientation or movement of the device 100.

Display controller 214 is circuitry for sending image data to be displayed on display 216. Display controller 214 receives the image data from ISP 206, CPU 208, graphic processor 220 or system memory 230 and processes the image data into a format suitable for display on display 216.

Memory controller 222 is circuitry for communicating with system memory 230. Memory controller 222 may read data from system memory 230 for processing by ISP 206, CPU 208, GPU 220 or other subcomponents of SOC component 204. Memory controller 222 may also write data to system memory 230 received from various subcomponents of SOC component 204.

Video encoder 224 is hardware, software, firmware or a combination thereof for encoding video data into a format suitable for storing in persistent storage 228 or for passing the data to network interface 210 for transmission over a network to another device.

In some embodiments, one or more subcomponents of SOC component 204 or some functionality of these subcomponents may be performed by software components executed on ISP 206, CPU 208 or GPU 220. Such software components may be stored in system memory 230, persistent storage 228 or another device communicating with device 100 via network interface 210.

Image data or video data may flow through various data paths within SOC component 204. In one example, raw image data may be generated from the image sensor 202 and processed by ISP 206, and then sent to system memory 230 via bus 232 and memory controller 222. After the image data is stored in system memory 230, it may be accessed by video encoder 224 for encoding or by display 116 for displaying via bus 232.

In another example, image data is received from sources other than the image sensor 202. For example, video data may be streamed, downloaded, or otherwise communicated to the SOC component 204 via wired or wireless network. The image data may be received via network interface 210 and written to system memory 230 via memory controller 222. The image data may then be obtained by ISP 206 from system memory 230 and processed through one or more image processing pipeline stages, as described below in detail with reference to FIG. 3. The image data may then be returned to system memory 230 or be sent to video encoder 224, display controller 214 (for display on display 216), or storage controller 226 for storage at persistent storage 228.

Example Image Signal Processing Pipelines

Figure 3:
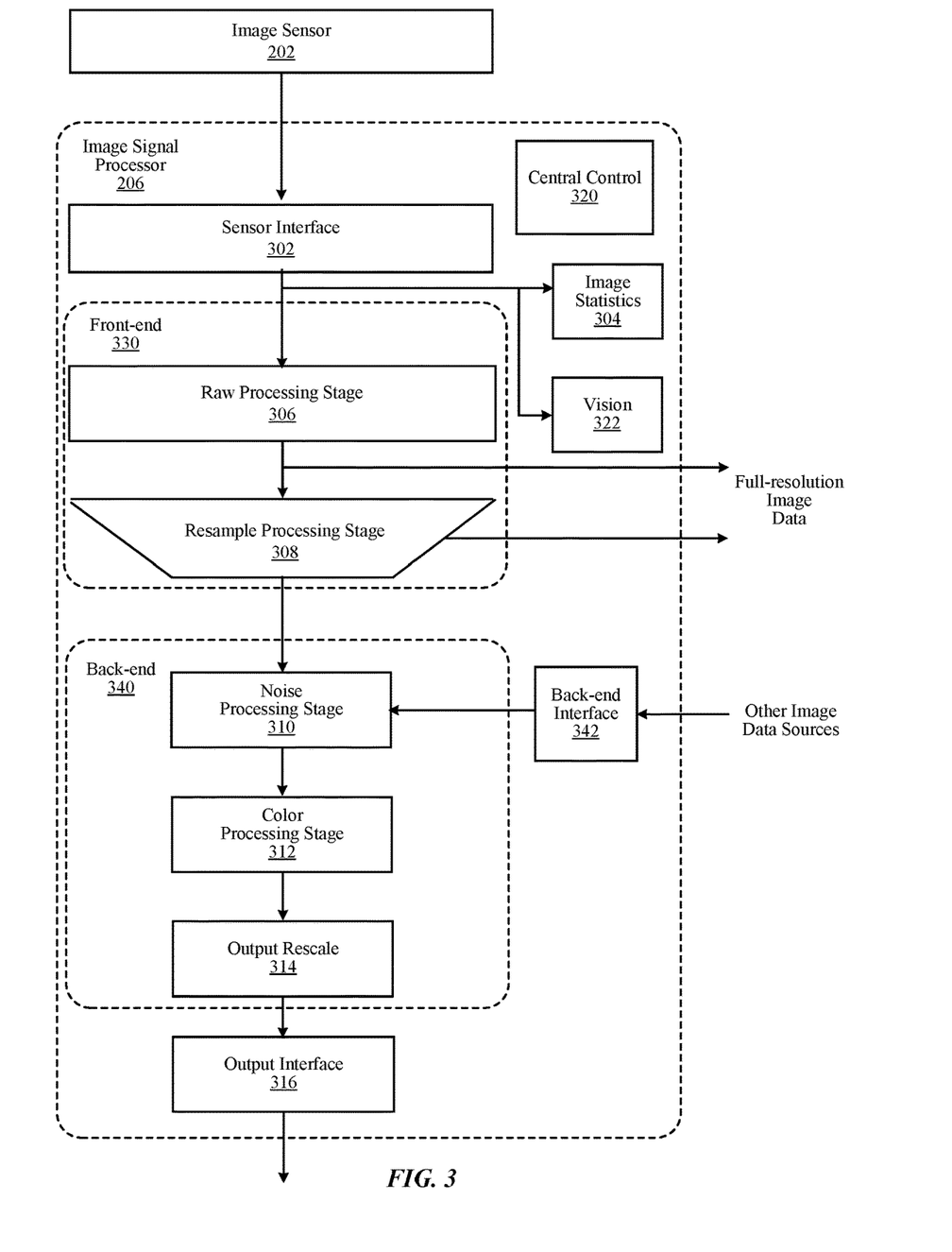
FIG. 3 is a block diagram illustrating image processing pipelines implemented using an image signal processor, according to one embodiment.

FIG. 3 is a block diagram illustrating image processing pipelines implemented using ISP 206, according to one embodiment. In the embodiment of FIG. 3, ISP 206 is coupled to image sensor 202 to receive raw image data. ISP 206 implements an image processing pipeline which may include a set of stages that process image information from creation, capture or receipt to output. ISP 206 may include, among other components, sensor interface 302, central control 320, front-end pipeline stages 330, back-end pipeline stages 340, image statistics module 304, vision module 322, back-end interface 342, and output interface 316. ISP 206 may include other components not illustrated in FIG. 3 or may omit one or more components illustrated in FIG. 3.

In one or more embodiments, different components of ISP 206 process image data at different rates. In the embodiment of FIG. 3, front-end pipeline stages 330 (e.g., raw processing stage 306 and resample processing stage 308) may process image data at an initial rate. Thus, the various different techniques, adjustments, modifications, or other processing operations performed by these front-end pipeline stages 330 at the initial rate. For example, if the front-end pipeline stages 330 process 2 pixels per clock cycle, then raw processing stage 306 operations (e.g., black level compensation, highlight recovery and defective pixel correction) may process 2 pixels of image data at a time. In contrast, one or more back-end pipeline stages 340 may process image data at a different rate less than the initial data rate. For example, in the embodiment of FIG. 3, back-end pipeline stages 340 (e.g., noise processing stage 310, color processing stage 312, and output rescale 314) may be processed at a reduced rate (e.g., 1 pixel per clock cycle). Although embodiments described herein include embodiments in which the one or more back-end pipeline stages 340 process image data at a different rate than an initial data rate, in some embodiments back-end pipeline stages 340 may process image data at the initial data rate.

Sensor interface 302 receives raw image data from image sensor 202 and processes the raw image data into an image data processable by other stages in the pipeline. Sensor interface 302 may perform various preprocessing operations, such as image cropping, binning or scaling to reduce image data size. In some embodiments, pixels are sent from the image sensor 202 to sensor interface 302 in raster order (i.e., horizontally, line by line). The subsequent processes in the pipeline may also be performed in raster order and the result may also be output in raster order. Although only a single image sensor and a single sensor interface 302 are illustrated in FIG. 3, when more than one image sensor is provided in device 100, a corresponding number of sensor interfaces may be provided in ISP 206 to process raw image data from each image sensor.

Front-end pipeline stages 330 process image data in raw or full-color domains. Front-end pipeline stages 330 may include, but are not limited to, raw processing stage 306 and resample processing stage 308. A raw image data may be in Bayer raw format, for example. In Bayer raw image format, pixel data with values specific to a particular color (instead of all colors) is provided in each pixel. In an image capturing sensor, image data is typically provided in a Bayer pattern. Raw processing stage 306 may process image data in a Bayer raw format.

The operations performed by raw processing stage 306 include, but are not limited, sensor linearization, black level compensation, fixed pattern noise reduction, defective pixel correction, raw noise filtering, lens shading correction, white balance gain, and highlight recovery. Sensor linearization refers to mapping non-linear image data to linear space for other processing. Black level compensation refers to providing digital gain, offset and clip independently for each color component (e.g., Gr, R, B, Gb) of the image data. Fixed pattern noise reduction refers to removing offset fixed pattern noise and gain fixed pattern noise by subtracting a dark frame from an input image and multiplying different gains to pixels. Defective pixel correction refers to detecting defective pixels, and then replacing defective pixel values. Raw noise filtering refers to reducing noise of image data by averaging neighbor pixels that are similar in brightness. Highlight recovery refers to estimating pixel values for those pixels that are clipped (or nearly clipped) from other channels. Lens shading correction refers to applying a gain per pixel to compensate for a dropoff in intensity roughly proportional to a distance from a lens optical center. White balance gain refers to providing digital gains for white balance, offset and clip independently for all color components (e.g., Gr, R, B, Gb in Bayer format). Components of ISP 206 may convert raw image data into image data in full-color domain, and thus, raw processing stage 306 may process image data in the full-color domain in addition to or instead of raw image data.

Resample processing stage 308 performs various operations to convert, resample, or scale image data received from raw processing stage 306. Operations performed by resample processing stage 308 may include, but not limited to, demosaic operation, per-pixel color correction operation, Gamma mapping operation, color space conversion and downscaling or sub-band splitting. Demosaic operation refers to converting or interpolating missing color samples from raw image data (for example, in a Bayer pattern) to output image data into a full-color domain. Demosaic operation may include low pass directional filtering on the interpolated samples to obtain full-color pixels. Per-pixel color correction operation refers to a process of performing color correction on a per-pixel basis using information about relative noise standard deviations of each color channel to correct color without amplifying noise in the image data. Gamma mapping refers to converting image data from input image data values to output data values to perform special image effects, including black and white conversion, sepia tone conversion, negative conversion, or solarize conversion. For the purpose of Gamma mapping, lookup tables (or other structures that index pixel values to another value) for different color components or channels of each pixel (e.g., a separate lookup table for Y, Cb, and Cr color components) may be used. Color space conversion refers to converting color space of an input image data into a different format. In one embodiment, resample processing stage 308 converts RBD format into YCbCr format for further processing.

Central control module 320 may control and coordinate overall operation of other components in ISP 206. Central control module 320 performs operations including, but not limited to, monitoring various operating parameters (e.g., logging clock cycles, memory latency, quality of service, and state information), updating or managing control parameters for other components of ISP 206, and interfacing with sensor interface 302 to control the starting and stopping of other components of ISP 206. For example, central control module 320 may update programmable parameters for other components in ISP 206 while the other components are in an idle state. After updating the programmable parameters, central control module 320 may place these components of ISP 206 into a run state to perform one or more operations or tasks. Central control module 320 may also instruct other components of ISP 206 to store image data (e.g., by writing to system memory 230 in FIG. 2) before, during, or after resample processing stage 308. In this way full resolution image data in raw or full-color domain format may be stored in addition to or instead of processing the image data output from resample processing stage 308 through backend pipeline stages 340.

Image statistics module 304 performs various operations to collect statistic information associated with the image data. The operations for collecting statistics information may include, but not limited to, sensor linearization, mask patterned defective pixels, sub-sample raw image data, detect and replace non-patterned defective pixels, black level compensation, lens shading correction, and inverse black level compensation. After performing one or more of such operations, statistics information such as 3A statistics (Auto white balance (AWB), auto exposure (AE), auto focus (AF)), histograms (e.g., 2D color or component) and any other image data information may be collected or tracked. In some embodiments, certain pixels' values, or areas of pixel values may be excluded from collections of certain statistics data (e.g., AF statistics) when preceding operations identify clipped pixels. Although only a single statistics module 304 is illustrated in FIG. 3, multiple image statistics modules may be included in ISP 206. In such embodiments, each statistic module may be programmed by central control module 320 to collect different information for the same or different image data.

Vision module 322 performs various operations to facilitate computer vision operations at CPU 208 such as facial detection in image data. The vision module 322 may perform various operations including pre-processing, global tone-mapping and Gamma correction, vision noise filtering, resizing, keypoint detection, convolution and generation of histogram-of-orientation gradients (HOG). The pre-processing may include subsampling or binning operation and computation of luminance if the input image data is not in YCrCb format. Global mapping and Gamma correction can be performed on the pre-processed data on luminance image. Vision noise filtering is performed to remove pixel defects and reduce noise present in the image data, and thereby, improve the quality and performance of subsequent computer vision algorithms. Such vision noise filtering may include detecting and fixing dots or defective pixels, and performing bilateral filtering to reduce noise by averaging neighbor pixels of similar brightness. Various vision algorithms use images of different sizes and scales. Resizing of an image is performed, for example, by binning or linear interpolation operation. Keypoints are locations within an image that are surrounded by image patches well suited to matching in other images of the same scene or object. Such keypoints are useful in image alignment, computing cameral pose and object tracking. Keypoint detection refers to the process of identifying such keypoints in an image. Convolution may be used in image/video processing and machine vision. Convolution may be performed, for example, to generate edge maps of images or smoothen images. HOG provides descriptions of image patches for tasks in mage analysis and computer vision. HOG can be generated, for example, by (i) computing horizontal and vertical gradients using a simple difference filter, (ii) computing gradient orientations and magnitudes from the horizontal and vertical gradients, and (iii) binning the gradient orientations.

Back-end interface 342 receives image data from other image sources than image sensor 202 and forwards it to other components of ISP 206 for processing. For example, image data may be received over a network connection and be stored in system memory 230. Back-end interface 342 retrieves the image data stored in system memory 230 and provide it to back-end pipeline stages 340 for processing. One of many operations that are performed by back-end interface 342 is converting the retrieved image data to a format that can be utilized by back-end processing stages 340. For instance, back-end interface 342 may convert RGB, YCbCr 4:2:0, or YCbCr 4:2:2 formatted image data into YCbCr 4:4:4 color format.

Back-end pipeline stages 340 processes image data according to a particular full-color format (e.g., YCbCr 4:4:4 or RGB). In some embodiments, components of the back-end pipeline stages 340 may convert image data to a particular full-color format before further processing. Back-end pipeline stages 340 may include, among other stages, noise processing stage 310 and color processing stage 312. Back-end pipeline stages 340 may include other stages not illustrated in FIG. 3.

Noise processing stage 310 performs various operations to reduce noise in the image data. The operations performed by noise processing stage 310 include, but are not limited to, color space conversion, gamma/de-gamma mapping, temporal filtering, noise filtering, luma sharpening, and chroma noise reduction. The color space conversion may convert an image data from one color space format to another color space format (e.g., RGB format converted to YCbCr format). Gamma/de-gamma operation converts image data from input image data values to output data values to perform special image effects. Temporal filtering filters noise using a previously filtered image frame to reduce noise. For example, pixel values of a prior image frame are combined with pixel values of a current image frame. Noise filtering may include, for example, spatial noise filtering. Luma sharpening may sharpen luma values of pixel data while chroma suppression may attenuate chroma to gray (i.e. no color). In some embodiment, the luma sharpening and chroma suppression may be performed simultaneously with spatial nose filtering. The aggressiveness of noise filtering may be determined differently for different regions of an image. Spatial noise filtering may be included as part of a temporal loop implementing temporal filtering. For example, a previous image frame may be processed by a temporal filter and a spatial noise filter before being stored as a reference frame for a next image frame to be processed. In other embodiments, spatial noise filtering may not be included as part of the temporal loop for temporal filtering (e.g., the spatial noise filter may be applied to an image frame after it is stored as a reference image frame (and thus is not a spatially filtered reference frame).

Color processing stage 312 may perform various operations associated with adjusting color information in the image data. The operations performed in color processing stage 312 include, but are not limited to, local tone mapping, gain/offset/clip, color correction, three-dimensional color lookup, gamma conversion, and color space conversion. Local tone mapping refers to spatially varying local tone curves in order to provide more control when rendering an image. For instance, a two-dimensional grid of tone curves (which may be programmed by the central control module 320) may be bi-linearly interpolated such that smoothly varying tone curves are created across an image. In some embodiments, local tone mapping may also apply spatially varying and intensity varying color correction matrices, which may, for example, be used to make skies bluer while turning down blue in the shadows in an image. Digital gain/offset/clip may be provided for each color channel or component of image data. Color correction may apply a color correction transform matrix to image data. 3D color lookup may utilize a three dimensional array of color component output values (e.g., R, G, B) to perform advanced tone mapping, color space conversions, and other color transforms. Gamma conversion may be performed, for example, by mapping input image data values to output data values in order to perform gamma correction, tone mapping, or histogram matching. Color space conversion may be implemented to convert image data from one color space to another (e.g., RGB to YCbCr). Other processing techniques may also be performed as part of color processing stage 312 to perform other special image effects, including black and white conversion, sepia tone conversion, negative conversion, or solarize conversion.

Output rescale module 314 may resample, transform and correct distortion on the fly as the ISP 206 processes image data. Output rescale module 314 may compute a fractional input coordinate for each pixel and uses this fractional coordinate to interpolate an output pixel via a polyphase resampling filter. A fractional input coordinate may be produced from a variety of possible transforms of an output coordinate, such as resizing or cropping an image (e.g., via a simple horizontal and vertical scaling transform), rotating and shearing an image (e.g., via non-separable matrix transforms), perspective warping (e.g., via an additional depth transform) and per-pixel perspective divides applied in piecewise in strips to account for changes in image sensor during image data capture (e.g., due to a rolling shutter), and geometric distortion correction (e.g., via computing a radial distance from the optical center in order to index an interpolated radial gain table, and applying a radial perturbance to a coordinate to account for a radial lens distortion).

Output rescale module 314 may apply transforms to image data as it is processed at output rescale module 314. Output rescale module 314 may include horizontal and vertical scaling components. The vertical portion of the design may implement series of image data line buffers to hold the "support" needed by the vertical filter. As ISP 206 may be a streaming device, it may be that only the lines of image data in a finite-length sliding window of lines are available for the filter to use. Once a line has been discarded to make room for a new incoming line, the line may be unavailable. Output rescale module 314 may statistically monitor computed input Y coordinates over previous lines and use it to compute an optimal set of lines to hold in the vertical support window. For each subsequent line, output rescale module may automatically generate a guess as to the center of the vertical support window. In some embodiments, output rescale module 314 may implement a table of piecewise perspective transforms encoded as digital difference analyzer (DDA) steppers to perform a per-pixel perspective transformation between a input image data and output image data in order to correct artifacts and motion caused by sensor motion during the capture of the image frame. Output rescale may provide image data via output interface 316 to various other components of device 100, as discussed above with regard to FIGS. 1 and 2.

In various embodiments, the functionally of components 302 through 342 may be performed in a different order than the order implied by the order of these functional units in the image processing pipeline illustrated in FIG. 3, or may be performed by different functional components than those illustrated in FIG. 3. Moreover, the various components as described in FIG. 3 may be embodied in various combinations of hardware, firmware or software.

Figure 4:
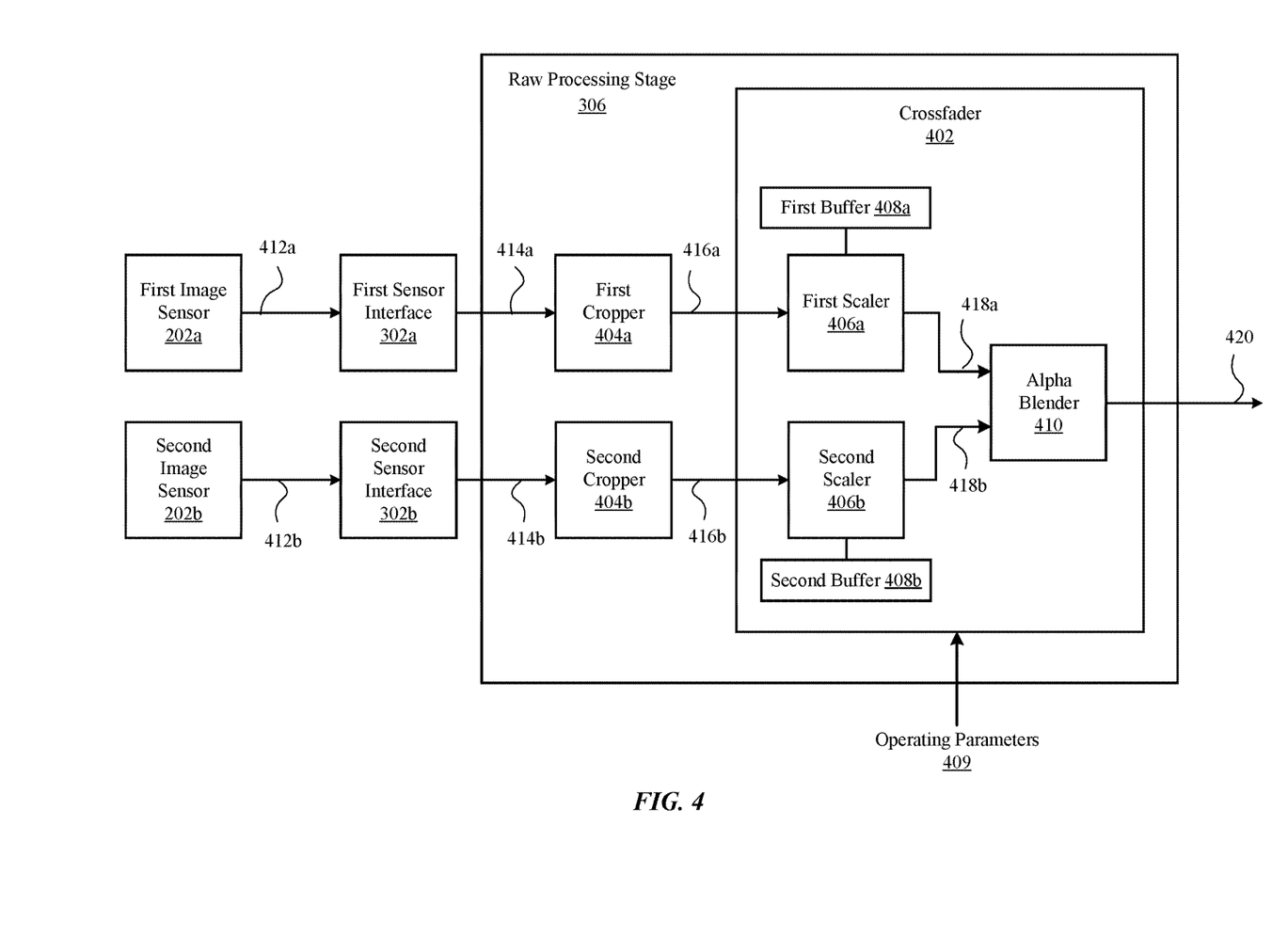
FIG. 4 is a block diagram illustrating a crossfader circuit and its surrounding circuits, according to one embodiment.

Example Sensors, Sensor Interfaces, and Raw Processing Stage Including a Crossfader FIG. 4 is a block diagram illustrating a crossfader circuit 402 and its surrounding circuits, according to one embodiment. In the embodiment of FIG. 4, the crossfader circuit 402 is part of a raw processing stage 306. The raw processing stage 306 receives raw input data from first image sensor 202a and a second image sensor 202b via a first sensor interface 302a and a second sensor interface 302b, respectively. Although FIG. 4 illustrates raw input data being directly sent from first and second image sensors 202a, 202b to first and second sensor interfaces 302a, 302b, and then to raw processing stage 306, in some embodiments the raw input data may be stored in system memory 230 prior to being sent to first or second sensor interface 302a, 302b or raw processing stage 306. The raw processing stage 306 may further include a first cropper 404a and a second cropper 404b in addition to the crossfader 402.

The first image sensor 202a captures raw image data of a first field of view. The first image sensor 202a sends captured raw image data 412a to the first sensor interface 302a. The first image sensor 202a may be a telephoto camera. The first sensor interface 302a is coupled to the first image sensor 202a to receive raw image data 412a from the first image sensor 202a. The first sensor interface 302a processes raw image data 412a and provides processed data 414a to the raw processing stage 306. The processed data 414a is also in Bayer pattern. In some embodiments the raw input data 412a or 414a of the first field of view may be stored in system memory 230 prior to being sent to first sensor interface 302a or raw processing stage 306.

The second image sensor 202b captures raw image data of a second field of view. The second image sensor 202b may be a wide angle camera with a field of view larger than the first image sensor 202a. The second image sensor 202b may be spatially offset from the first image sensor 202a, for example, as image sensors 164 are shown to be offset in FIG. 1, and as a result, the second image sensor 202b may produce raw image data that is offset from raw image data produced by the first image sensor 202a. The second image sensor 202b provides captured raw image data 412b to the second sensor interface 302b. The second sensor interface 302b processes raw image data 412b and provides processed data 414b to the raw processing stage 306. The processed data 414b is also in Bayer pattern. In some embodiments the raw input data 412b or 414b of the second field of view may be stored in system memory 230 prior to being sent to second sensor interface 302b or raw processing stage 306.

The first cropper 404a is a circuit that receives first processed data 414a from the first sensor interface 302a and crops the first processed data 414a to provide first cropped data as raw image data 416a to the crossfader circuit 402. The first cropper 404a may selectively bypass or crop received data to produce first raw image data 416a. For example, the first image sensor 202a is a telephoto camera and the processed data from the telephoto camera may not be cropped but bypassed to the first scaler 406a.

The second cropper 404b is a circuit that receives second processed data 414b from the second sensor interface 302b and crops the second processed data 414b to provide second cropped data as second raw image data 416b to the crossfader circuit 402.

The crossfader circuit 402 is a circuit that perform crossfading operation. The crossfader circuit 402 may include, among other components, a first scaler 406a, a second scaler 406b, a first buffer 408a, a second buffer 408b, and an alpha blender 410. The crossfader circuit 402 may include other components not illustrated in FIG. 4.

The first scaler 406a is a circuit that receives a first raw image data 416a from the first cropper 404a. The first scaler 406a may downscale or upscale the first raw image data 416a to a first scaled raw image data 418a to match a size of a blending window. The blending window is defined by a width of predetermined number of pixels and a height of predetermined number of pixels where image data is blended (e.g., data from the first and second image sensors 202a and 202b). The first scaler 406a may include, among other components, a first vertical scaler (not shown), a first horizontal scaler (not shown), and a first line buffer 408a between the first vertical scaler and the first horizontal scaler to store at least one line of scaled pixels.

The second scaler 406b is a circuit that receives a second raw image data 416b from the second cropper 404b. The second scaler 406b may upscale or downscale a second raw image data 416b to a second scaled raw image data 418b to match a size of a canvas window that encloses the blending window. The canvas window is defined by a width of predetermined number of pixels and a height of predetermined number of pixels that matches the width and height of the blended raw image data 420 output by the crossfader circuit 402. The second scaler 406b may include, among other components, a second vertical scaler (not shown), a second horizontal scaler (not shown), and a second line buffer 408b between the second vertical scaler and the first horizontal scaler to store at least one line of scaled pixels.

In one embodiment, the first scaler 406a and the second scaler 406b may use multi-tap polyphaser filters for scaling (e.g., two-tap, four-tap polyphaser filter). For example, two-tap polyphaser filters may be used in the first scaler and the second scaler 406a, 406b. Two-tap polyphase filters use neighboring input pixels to produce an output pixel by linear interpolation. If an output pixel is located on top of the input pixel, the output pixel is given the same value as the input pixel without any interpolation. Thus, each pixel of scaled image data is interpolated from two pixels of raw image data at locations closest to the pixel of the scaled image data, except for pixels of the scaled image data with pixels of the raw image data at coinciding locations.

The alpha blender 410 is a circuit that receives a first scaled raw image data 418a from the first scaler 406a and second scaled raw image data 418b from the second scaler 406b. The alpha blender 410 blends pixels of the first scaled raw image data 418a and second scaled raw image data 418b to produce a blended raw image data 420 that is output by the crossfader circuit 402. In one embodiment, the alpha blender circuit 410 generates a pixel value for a pixel of the blended raw image data 420 by adding a pixel value of a corresponding pixel of the first scaled raw image data 418a multiplied by an alpha value and a pixel value of the corresponding pixel of the second scaled raw image data 418b multiplied by one minus the alpha value. The first scaled raw image data 418a and the second scaled raw image data 418b may be Bayer pattern encoded data.

One or more parameters 409 may be input to the crossfader circuit 402 to control the operation of the crossfader circuit 402. The crossfader circuit 402 may receive parameters 409 from the central control 320 or may retrieve parameters 409 from the central control 320. The operating parameters 409 may include an enable bit to disable or enable the crossfader from blending, or to have image data bypass the crossfader circuit 402 when either a first image sensor 202a or second image sensor 202b is disabled. Details of the blending and additional operating parameter 409 is discussed below in more detail with regards to FIG. 6.

Figure 5:
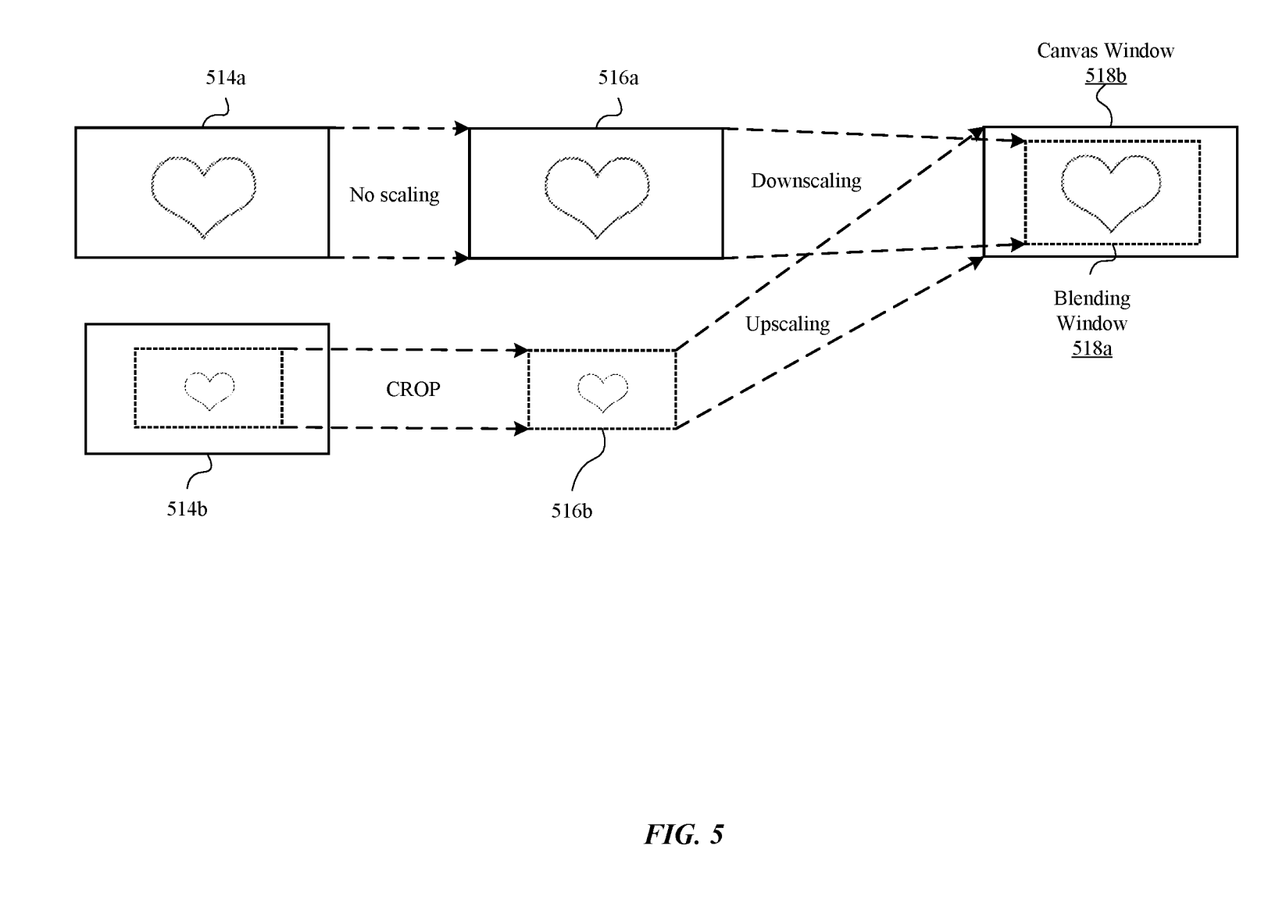
FIG. 5 is a concept diagram illustration of the operation performed at a crossfader circuit, according to one embodiment.

FIG. 5 is a concept diagram illustration of the operation performed at a crossfader circuit 402, according to one embodiment. In the embodiment of FIG. 5, images 514a and 516a are captured by the first image sensor 202a which is a telephoto camera while images 514b and 516b are captured by the second image sensor 202b which is a wide angle camera.

Image 514a may correspond to the first processed data 414a where no cropping was performed on first processed data 414a by the first cropper 404a. No scaling is performed on the image 514a, and hence, image 516a is same as image 514a, at least in terms of the width and height. As shown in FIG. 5, the image 516a is downscaled by the first scaler 406a to fit the size of a blending window 518a.

Image 514b is an example image from the second processed data 414b. The image 514b is cropped by the cropper 404b to produce the second raw image data 516b. Second raw image data 416b is then upscaled by the second scaler 406b to fit in the size of a canvas window 518b.

The canvas window 518b contains an example of blended raw image data 420. The alpha blender 410 blends first raw image data 416a that is downscaled by scaler 406a to fit in a blending window 518a and second raw image data 416b that is upscaled by scaler 406b to fit in a canvas window 518b to produce blended raw image data 420.

Figure 6:
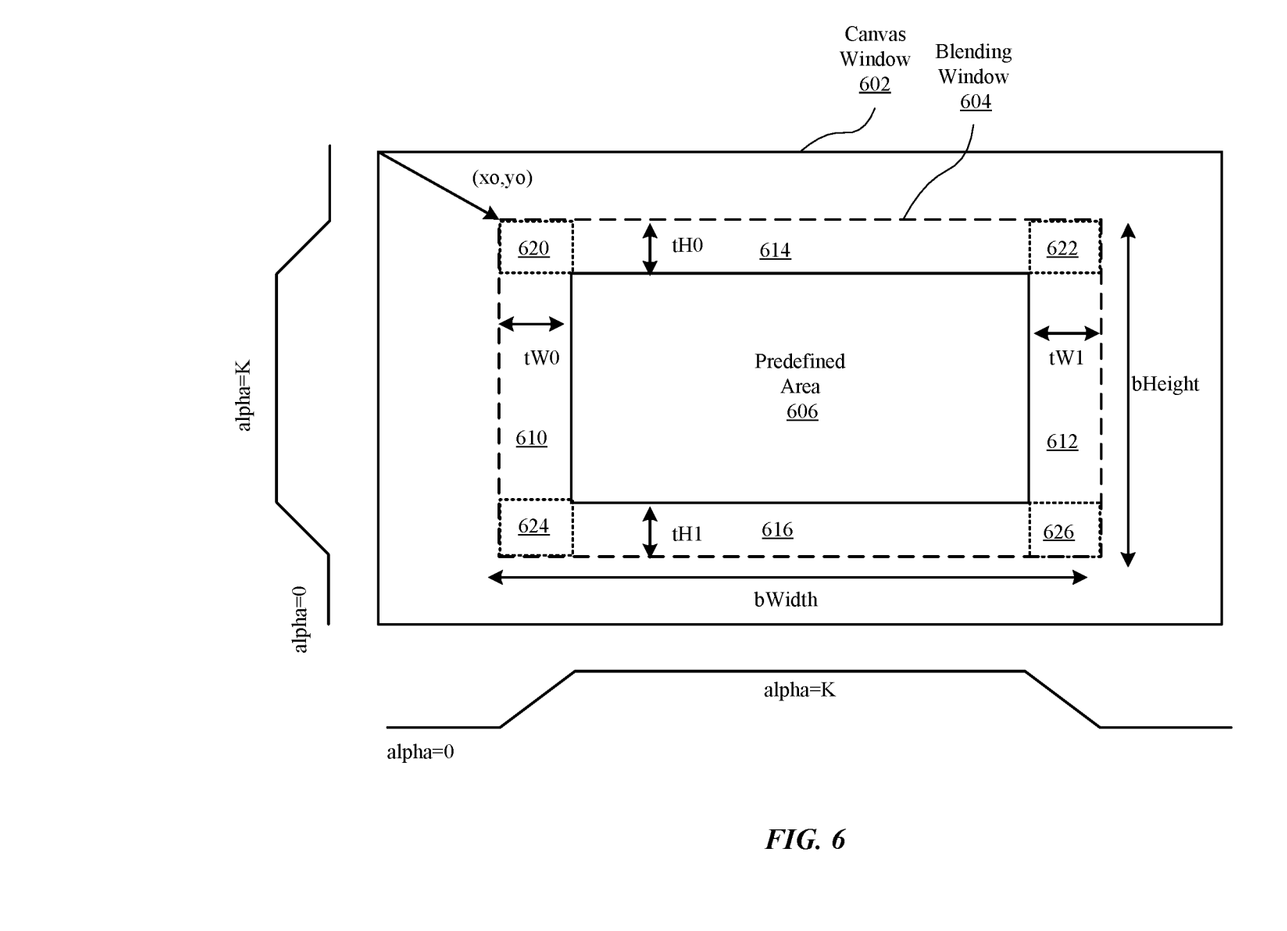
FIG. 6 is a diagram of a canvas window including parameters for blending, according to one embodiment.

FIG. 6 is a diagram illustrating canvas window 602 and parameters for blending, according to one embodiment. The canvas window 602 is rectangular in shape and contains a blending window 604. The blending window 604 is also rectangular in shape with height bHeight and width bWidth, and is offset from a top left corner of the canvas window 602 by coordinates (xo, yo). The blending window 604 includes a predefined area 606 and a transition area surrounding the predefined area 606. The transition area is made of linear areas 610, 612, 614, and 616 and corner areas 620, 622, 624, and 626.

The predefined area 606 is contained in the blending window 604 and is also rectangular in shape. The predefined area 606 is offset from a left edge of the blending window 604 by a width tW0 and from a right edge of the blending window 604 by a width tW1. The predefined area 606 is offset from a top edge of the blending window 604 by a height tH0 and offset from a bottom edge of the blending window 604 by a height tH1. The alpha value is a fixed value for pixels in the predefined area 606.

The linear areas 610, 612, 614, and 616 are located to the left, right, top, and bottom of the predefined area 606 inside the blending window 604 and are also rectangular in shape. A first linear area 610 is to the left of the predefined area 606 having a same height of the predefined area 606 and a width tW0. A second linear area 612 is to the right of predefined area 606 having a same height of the predefined area 606 and a width tW1. A third linear area 614 occurs to the top of the predefined area 606 having a same width of the predefined area 606 and a height tH0. A fourth linear area 616 occurs to the bottom of predefined area 606 having a same width of predefined area 606 and a height tH1. The alpha value is based on a horizontal change in distance from the predefined area 606 or a vertical change in distance from the predefined area 606 for pixels in linear areas of the blending window 604.

The corner areas 620, 622, 624, and 626 are located in the top left, top right, bottom left, and bottom right corners outside the predefined area 606 and inside the blending window 604 and are also rectangular in shape. A first corner area 620 is at a top left corner of the blending window 604 having a width tW0 and height tH0. A second corner area 622 at a top right corner of the blending window 604 and has a width tW1 and height tH0. A third corner area 624 at a bottom left corner of the blending window 604 has a width tW0 and height tH1. A fourth corner area 626 in the bottom right corner of the blending window 604 has a width tW1 and height tH1. The alpha value is based on a horizontal alpha value and a vertical alpha value for pixels in corner areas of the blending window 604. The horizontal alpha value is based on a horizontal change in distance from the predefined value, and the vertical alpha value is based on a vertical change in distance from the predefined value.

As previously mentioned in the description of FIG. 4, the first scaled raw image data 418a is the size of the blending window 604 and the second scaled raw image data 418b is the size of a canvas window 602. The alpha blender circuit generates a pixel value for a pixel of the blended raw image data 420 by adding a pixel value of a corresponding pixel of the first scaled raw image data 418a multiplied by an alpha value and a pixel value of the corresponding pixel of the second scaled raw image data 418b multiplied by one minus the alpha value. The operating parameter 409 may include sizes such as a window size (e.g., canvas or blending window), an alpha value (K) for blending, widths or heights (e.g., tW0, tW1, tH0, and tH1, bWidth, bHeight), offset of the blending window (xo,yo). The alpha blender 410 may blend pixels in the corner areas 620, 622, 624, and 626 of the blending window 604 using different schemes, one of which may be identified by the operating parameters 409.

The alpha value for pixels in the canvas window 602 depends on the location of the pixel. For pixels in the predefined area 606, the alpha value is K. For pixels in an area outside the blending window 604, the alpha value is zero. In the transition area outside the predefined area 606 and inside a blending window 604, the alpha value of a pixel changes in value based on a location of the pixel. For pixels in linear areas 610, 612, 614, and 616, the alpha value changes linearly from the first value to the second value as distances from the pixels to the predefined area increase in a horizontal or a vertical direction. For pixels in corner areas 620, 622, 624, and 626, the alpha value changes based on a horizontal alpha value and a vertical alpha value. The alpha value may be a minimum of the horizontal alpha value and the vertical alpha value. The alpha value may be a product of the horizontal alpha value and the vertical alpha value. Whether the minimum or the product of the horizontal alpha value and the vertical alpha value is used may be sent by an operating parameter 409.

A graph to the left of the canvas window 602 show how alpha values may change for pixels in a center column of the canvas window. A graph to the bottom of the canvas window 602 show how alpha values may change for pixels in a middle row of the canvas window 602. The alpha value for pixels in areas outside the blending window 604 are zero. The alpha values for pixels inside the predefined area 606 are K. The alpha values in a transition region (e.g., linear areas 610, 612, 614 and 616) change linearly from K to zero as distances from the pixels to the predefined area 606 increase.

Figure 7:
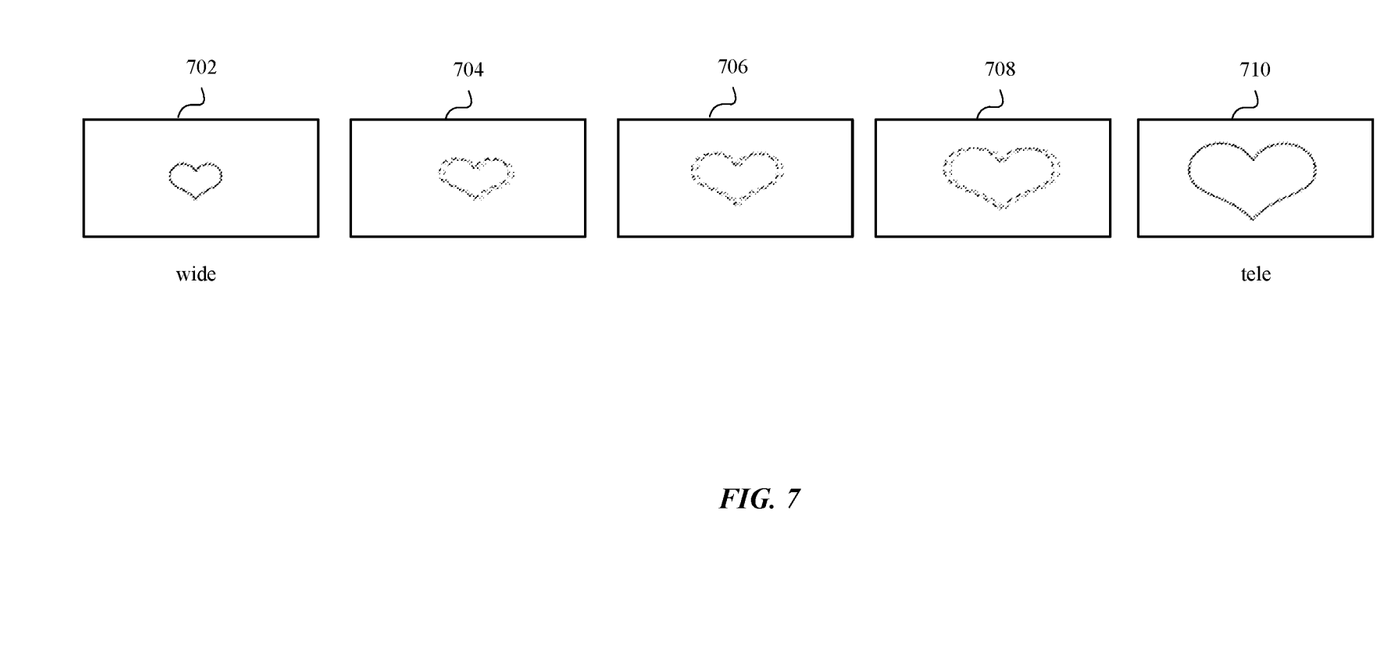
FIG. 7 is an example of the transition frames between a wide angle view and a tele photo view, according to one embodiment.

FIG. 7 is a diagram illustrating of transition frames between a wide angle view and a telephoto view, according to one embodiment. Frame 702 is an example image from a wide angle camera. An object shown in frame 702 occupies a small center area of the frame. Frame 710 is an example image from a telephoto camera in which the same object is shown. The same object shown in frame 710 occupies a larger center area of the frame. The transition frames 704, 706, and 708 between frames 702 and 710 may be used for supporting a zoom-in feature from frame 702 to 710 or a zoom-out feature from frame 710 to 702. The crossfader circuit 402 blends image data from the wide angle camera and telephoto camera views to produce the transition frames 704, 706, and 708. For example, the crossfader circuit 402 upscales image data from frame 702 and downscales image data from frame 710 and blends the result of the scaled images. The transition frames 704, 706, and 708 can be generated by blending different combination of scaled image data from frames 702 and 710.

Example Method of Crossfading Image Data

Figure 8:
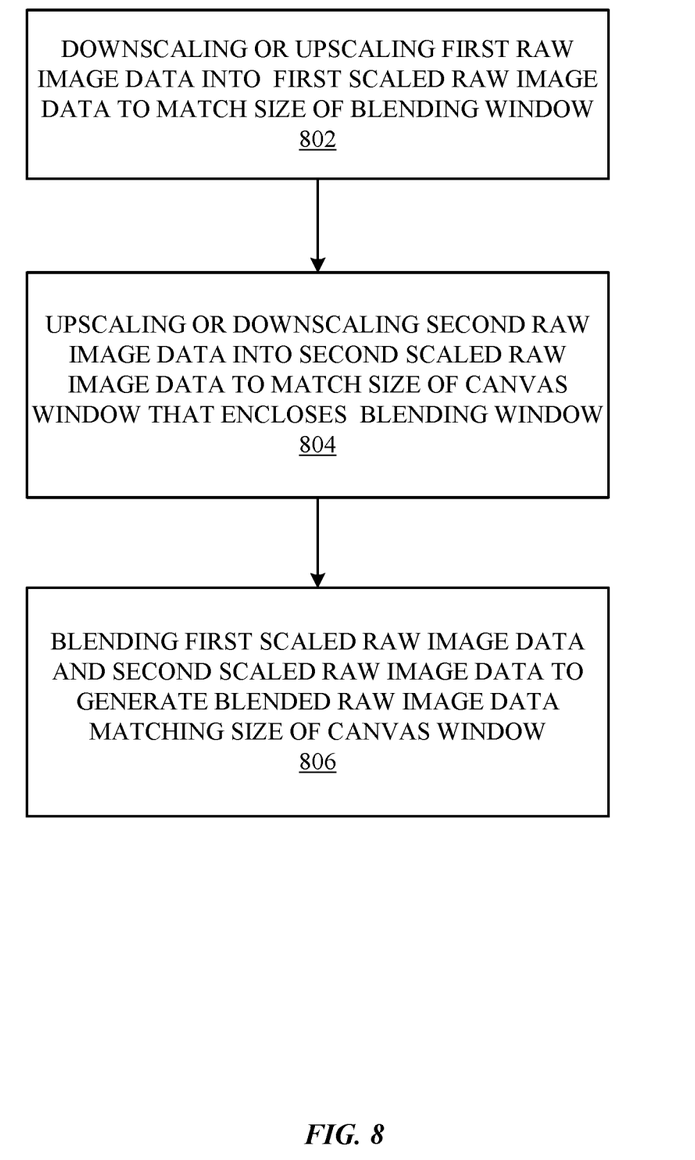
FIG. 8 is a flowchart illustrating a method of crossfading image data from two sensors, according to one embodiment.

FIG. 8 is a flowchart illustrating a method of crossfading image data from two sensors, according to one embodiment. The crossfader circuit 402 downscales or upscales 802 a first raw image data into a first scaled raw image data to match a size of a blending window. The first raw image data is captured by a first sensor of a first field of view.

The crossfader circuit 402 upscales or downscales 804 a second raw image data into second scaled raw image data to match a size of a canvas window that encloses the blending window. The second image data is captured by a second sensor with a second field of view wider than the first field of view.

The crossfader circuit 402 blends 806 the first scaled raw image data and the second scaled raw image data to generate a blended raw image data matching the size of the canvas window. The first raw image data and the second raw image data is Bayer pattern encoded data. A pixel value for the blended raw image data is generated by adding a pixel value of a corresponding pixel of the first scaled raw image multiplied by an alpha value and a pixel value of a corresponding pixel of the second scaled raw image multiplied by one minus the alpha value.

The process described above with reference to FIG. 8 is merely an example. Other embodiments may include different and/or additional steps, or perform the steps in different orders.

It should be noted that the language used in the specification has been principally selected for readability and instructional purposes, and may not have been selected to delineate or circumscribe the inventive subject matter. Accordingly, the disclosure herein is intended to be illustrative, but not limiting, of the scope of the invention, which is set forth in the following claims.

What is claimed is:

1. An apparatus for processing image signal data, comprising:
a cross fader circuit, comprising:
a first scaling circuit configured to downscale or upscale a first raw image data into a first scaled raw image data to match a size of a blending window, the first raw image data captured by a first sensor of a first field of view;
a second scaling circuit configured to upscale or downscale a second raw image data into a second scaled raw image data to match a size of a canvas window that encloses the blending window, the second raw image data captured by a second sensor of a second field of view wider than the first field of view; and
an alpha blender circuit coupled to the first scaling circuit and the second scaling circuit to receive the first scaled raw image data and the second scaled raw image data, the alpha blender circuit configured to generate a blended raw image data matching the size of the canvas window by blending the first scaled raw image data and the second scaled raw image data.

2. The apparatus of claim 1, wherein the first raw image data and the second raw image data is Bayer pattern encoded data.

3. The apparatus of claim 1, wherein the second raw image data is a cropped version of raw image data captured by the second sensor.

4. The apparatus of claim 1, wherein the first scaling circuit includes a first vertical scaler, a first horizontal scaler, and a first line buffer is between the first vertical scaler and the first horizontal scaler to store at least one line of scaled pixels.

5. The apparatus of claim 1, wherein the second scaling circuit includes a second vertical scaler, a second horizontal scaler after the second vertical scaler, and a second line buffer is between the second vertical scaler and the second horizontal scaler to store at least one line of scaled pixels.

6. The apparatus of claim 1, wherein the first scaling circuit and the second scaling circuit include multi-tap polyphase filters.

7. The apparatus of claim 1, wherein the alpha blender circuit is configured to generate a pixel value for a pixel of the blended raw image data by adding (i) a pixel value of a corresponding pixel of the first scaled raw image data multiplied by an alpha value and (ii) a pixel value of a corresponding pixel of the second scaled raw image data multiplied by one minus the alpha value.

8. The apparatus of claim 7, wherein:
the alpha value for pixels inside a predefined area is a first value,
the alpha value for pixels outside a transition area enclosing the predefined area and enclosed by the blending window is a second value,
the alpha value for pixels in the transition area changes linearly from the first value to the second value as distances from the pixels in the transition area to the predefined area increase in a horizontal direction or in a vertical direction, and
the alpha value for the pixels in the transition area is based on a horizontal alpha value and a vertical alpha value, the horizontal alpha value for the pixels in the transition area changing linearly from the first value to the second value as distances from the pixels in the transition area to the predefined area increase in the horizontal direction, the vertical alpha value for the pixels in the transition area changing linearly from the first value to the second value as distances from the pixels in the transition area to the predefined area increase in the vertical direction.

9. The apparatus of claim 8, wherein the alpha value for the pixels in the transition area is a minimum or a product of the horizontal alpha value and the vertical alpha value.

10. A method of crossfading image data from image sensors, comprising:
downscaling or upscaling, by a first scaling circuit, a first raw image data into a first scaled raw image data to match a size of a blending window, the first raw image data captured by a first sensor of a first field of view;
upscaling or downscaling, by a second scaling circuit, a second raw image data into second scaled raw image data to match a size of a canvas window that encloses the blending window, the second raw image data captured by a second sensor of a second field of view wider than the first field of view; and
blending, by an alpha blender circuit, the first scaled raw image data and the second scaled raw image data to generate a blended raw image data matching the size of the canvas window.

11. The method of claim 10, wherein the first raw image data and the second raw image data is Bayer pattern encoded data.

12. The method of claim 10, wherein the second raw image data is a cropped version of raw image data captured by the second sensor.

13. The method of claim 10, wherein the upscaling or downscaling is performed by multi-tap polyphase filters.

14. The method of claim 10, further comprising:
generating, by the alpha blender circuit, a pixel value for a pixel of the blended raw image data by adding (i) a pixel value of a corresponding pixel of the first scaled raw image data multiplied by an alpha value and (ii) a pixel value of a corresponding pixel of the second scaled raw image data multiplied by one minus the alpha value.

15. The method of claim 14, wherein the alpha value takes a first value across all pixels inside a predefined area, the alpha value takes a second value across all pixels outside a transition area enclosing the predefined area and enclosed by the blending window, and the alpha value for pixels in the transition area changes linearly from the first value to the second value as distances from the pixels in the transition area to the predefined area increase.

16. An electronic device, comprising:
a first image sensor of a first field of view generating first raw image data;
a second image sensor of a second field of view wider than the first field of view generating second raw image data; and
image signal processor comprising:
a cross fader circuit, comprising:
a first scaling circuit configured to downscale the first raw image data into
a first scaled raw image data to match a size of a blending window;
a second scaling circuit configured to upscale the second raw image data into a second scaled raw image data to match a size of a canvas window that encloses the blending window; and
an alpha blender circuit coupled to the first scaling circuit and the second scaling circuit to receive the first scaled raw image data and the second scaled raw image data, the alpha blender circuit configured to generate a blended raw image data matching the size of the canvas window by blending the first scaled raw image data and the second scaled raw image data;
a pipeline of circuits coupled to the cross fader circuit and configured to perform processing on the blended raw image data.

17. The electronic device of claim 16, wherein the first raw image data and the second raw image data is Bayer pattern encoded data and the second raw image data is a cropped version of raw image data captured by the second sensor.

18. The electronic device of claim 16, wherein the first scaling circuit includes a first vertical scaler, a first horizontal scaler, and a first line buffer is between the first vertical scaler and the first horizontal scaler to store at least one line of scaled pixels.

19. The electronic device of claim 16, wherein the second scaling circuit includes a second vertical scaler, a second horizontal scaler after the second vertical scaler, and a second line buffer is between the second vertical scaler and the second horizontal scaler to store at least one line of scaled pixels.

20. The electronic device of claim 16, wherein the first scaling circuit and the second scaling circuit include multi-tap polyphase filters.

* * * * *